US007278755B2

United States Patent
Inamoto

(10) Patent No.: US 7,278,755 B2
(45) Date of Patent: Oct. 9, 2007

(54) ILLUMINATION APPARATUS

(75) Inventor: Masayuki Inamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 10 days.

(21) Appl. No.: 11/148,197

(22) Filed: Sep. 6, 2005

(65) Prior Publication Data

US 2005/0281029 A1 Dec. 22, 2005

(30) Foreign Application Priority Data

Jun. 10, 2004 (JP) .............................. 2004-173124

(51) Int. Cl.
*F21V 11/00* (2006.01)
(52) U.S. Cl. ...................... 362/240; 359/626; 353/30; 362/268
(58) Field of Classification Search ................ 362/240, 362/231, 235–238, 332, 268, 244; 353/94, 353/102, 30, 39, 13; 348/801; 359/621–623, 359/626
See application file for complete search history.

(56) References Cited

U.S. PATENT DOCUMENTS

| 5,418,583 | A | * | 5/1995 | Masumoto | 353/38 |
| 5,430,562 | A | * | 7/1995 | Fushimi et al. | 349/5 |
| 5,650,876 | A | * | 7/1997 | Davies et al. | 359/622 |
| 5,786,939 | A | * | 7/1998 | Watanabe | 359/621 |
| 6,381,071 | B1 | * | 4/2002 | Dona et al. | 359/621 |
| 6,513,953 | B1 | * | 2/2003 | Itoh | 362/331 |
| 6,796,654 | B2 | * | 9/2004 | Huang | 353/20 |
| 2003/0058655 | A1 | * | 3/2003 | Chuang | 362/521 |
| 2005/0122487 | A1 | * | 6/2005 | Koyama et al. | 353/94 |
| 2006/0132725 | A1 | * | 6/2006 | Terada et al. | 353/102 |

FOREIGN PATENT DOCUMENTS

JP 2003-330109 11/2003

* cited by examiner

*Primary Examiner*—Thomas M. Sember
*Assistant Examiner*—Julie A. Shallenberger
(74) *Attorney, Agent, or Firm*—Young & Thompson

(57) ABSTRACT

An illumination apparatus is provided with an LED array including a plurality of LEDs and a second lens array including a plurality of lenses. The LEDs and the lenses are arranged in lengthwise and crosswise directions and aligned such that a relationship between a number of the LEDs and a number of the lenses are mutually prime with each other in both lengthwise and crosswise directions. Primary illumination light from the LED array is split into a plurality of pieces of secondary illumination light by the lenses and thereafter superposed to irradiate. All of pieces of the secondary illumination light are provided with different strength peak positions of the illumination light and therefore, light having a uniform intensity can be irradiated to an irradiated region.

9 Claims, 7 Drawing Sheets

ILLUMINATION APPARATUS

This application is based on Japanese Patent application JP2004-173124, filed Jun. 10, 2004, the entire content of which is hereby incorporated by reference. This claim for priority benefit is being filed concurrently with the filing of this application.

BACKGROUND OF THE INVENTION

1. Technical Field of the Invention

The present invention relates to an illumination apparatus using an LED array with a plurality of LEDs as a light source, particularly relates to an illumination apparatus capable of illuminating light having a uniform intensity to an illuminated region.

2. Description of the Related Art

There is known a liquid crystal projector for projecting image light generated by illuminating a liquid crystal panel to a screen. Although as an illumination apparatus for illuminating a liquid crystal panel, an ultra high pressure mercury lamp, a metal halide lamp or the like is used as a light source, in recent years, there is investigated to use LED capable of achieving small-sized formation and the low cost formation as a light source.

Since a brightness of individual LED is low, according to the illumination apparatus constituting a light source by LED, an LED array with a plurality of LEDs is used. However, when light from each LED is irradiated to a comparatively narrow area of an irradiated region of a display element and a total of an illuminated region is intended to cover by connecting together the narrow areas, a nonuniformity is brought about in a total irradiation region by an illumination distribution characteristic of a single piece of LED in which a center thereof is bright and a periphery thereof is dark and a dispersion in a brightness provided to individual LED.

Therefore, for example, JP-A-2003-330109, shown below, describes an illumination apparatus provided with lenses to be opposed to respective LEDs of an LED array and superposing light from respective LEDs to irradiate to an irradiated region by the lenses.

However, although the apparatus described in JP-A-2003-330109 achieves an effect of preventing a drawback by the dispersion in the brightness of each LED, the apparatus is not sufficient for preventing a nonuniformity in the brightness from being brought about to the total irradiation region. That is, light emitted from LED is provided with a directivity and therefore, the light is irradiated in a certain angular region, further, the more proximate to the center of an irradiation angle (optical axis), the higher the intensity of light. Further, since pieces of light from individual LEDs having a high center intensity in this way are superposed by the lenses and therefore, the intensity of the center is increased even in the total irradiation region.

For example, when, as shown by FIG. 6A, LEDs 2 and lenses 4 are aligned to correspond to each other by 1:1 correspondence and pieces of light from respective LEDs 2 are superposed to irradiate to the irradiated region by the corresponding lenses 4, as shown by FIG. 6B, all of the pieces of superposed light are provided with intensity peaks at centers in a lengthwise direction and a crosswise direction. Further, since the pieces of light having the high center intensities are superposed and therefore, as shown by FIG. 6C, a brightness of a center of an irradiated region 6 is increased.

Further, even when either one of a number of LEDs and a number of lenses is constituted by the other thereof multiplied by an integer, a nonuniformity in a brightness is brought about in an irradiated region. For example, when, as shown by FIG. 7A, a number of LEDs 2 is made to be four times as much as a number of the lenses 4, as shown by FIG. 7B, pieces of all of light to be superposed are provided with two intensity peaks at the same positions in a lengthwise direction and a crosswise direction. Further, the pieces of light are superposed in this way and therefore, as shown by FIG. 7C, the brightness is increased at four locations of the irradiated region 6.

Further, when, for example, as shown by FIG. 8A, the number of the lenses 4 is made to be four times as much as the number of LEDs 2, illumination light from LED 2a is split to four pieces of light having intensity peaks respectively at a right lower side in the case of a lens 4a, a left lower side in the case of a lens 4b, a right upper side in the case of a lens 4c and a left upper side in the case of the lens 4d and these pieces of light are superposed to be irradiated to the irradiated region. Similarly, illumination light from all of LEDs 2 are split to four pieces of light respectively having intensity peaks at ones of four corners and superposed to be irradiated to the irradiated region. Thereby, as shown by FIG. 8B, an intensity of illumination light is increased at four corners of the irradiated region 6.

Further, other than the above-described examples, even when, for example, the number of LEDs, and the number of lenses are provided with a common devisor other than 1 such that 6 of LEDs 2 are aligned and 4 of the lenses 4 are aligned in either one direction of a lengthwise direction and a crosswise direction as shown by FIG. 9, the nonuniformity in the brightness is brought about in the irradiated region. In the case shown by FIG. 9, pieces of illumination light from 6 of LEDs of 2e through 2j are split by 4 of the lenses 4e through 4h and thereafter superposed to be irradiated to the irradiated region. At this occasion, pieces of light irradiated from the lens 4e and the lens 4g are provided with intensity peaks at equal positions at a center and at a right side in the drawing, further, pieces of light irradiated from the lens 4f and the lens 4h are provided with intensity peaks at equal positions of a center and at a right side. Therefore, the intensity of the illumination light is increased at the center and the both left and right sides of the irradiated region.

When as in the above-described examples, an in-face intensity distribution of superposed light is patterned, the nonuniformity in the brightness is brought about in the irradiated region.

SUMMARY OF THE INVENTION

It is an object of the invention to provide an illumination apparatus capable of preventing a nonuniformity in a brightness generated in an irradiated region. The object is achieved by an illumination apparatus comprising: an LED array including a plurality of light emitting diodes disposed in a two dimension; a first lens array including a plurality of first lenses in correspondence with the respective light emitting diodes, the first lens array emitting pieces of illumination light irradiated from the respective light emitting diodes to constitute pieces of collimated light in parallel with each other; and a superposing optical system comprising a second lens array which is opposed to the first lens array and includes a plurality of second lenses disposed in a two dimension, the superposing optical system splitting emitted light from the first lens array into a plurality of pieces of secondary illumination light by the second lens array and superposing the split respective pieces of secondary illumination light in a common illumination area to irradiate, wherein by making aligning patterns or aligning pitches of the first lens and the second lens differ from each other, respective in-face intensity distributions of the pieces of secondary illumination light emitted from the superposing optical system are made to be irregular so that the in-face intensity distributions are averaged in the common illumination area.

The invention may be characterized in that the respective aligning pitches in two-dimensional directions of the first lens and respective aligning pitches in two-dimensional directions of the second lens are made to differ from each other and aligning numbers in the two-dimensional directions of the first lens and the second lens are prime to each other. Further, the invention may be characterized in that one of aligning patterns of the first lens and the second lens is a matrix arrangement and the other thereof is a delta arrangement.

According to the illumination apparatus of the invention, the aligning patterns or the aligning pitches of the first lens and the second lens differ from each other and therefore, light from the LED array is split into a plurality of pieces of secondary illumination light in which positions of intensity peaks differ from each other irregularly and superposed to irradiate to the irradiated region. Thereby, a nonuniformity in brightness brought about in the irradiated region can be prevented.

Figure 1:
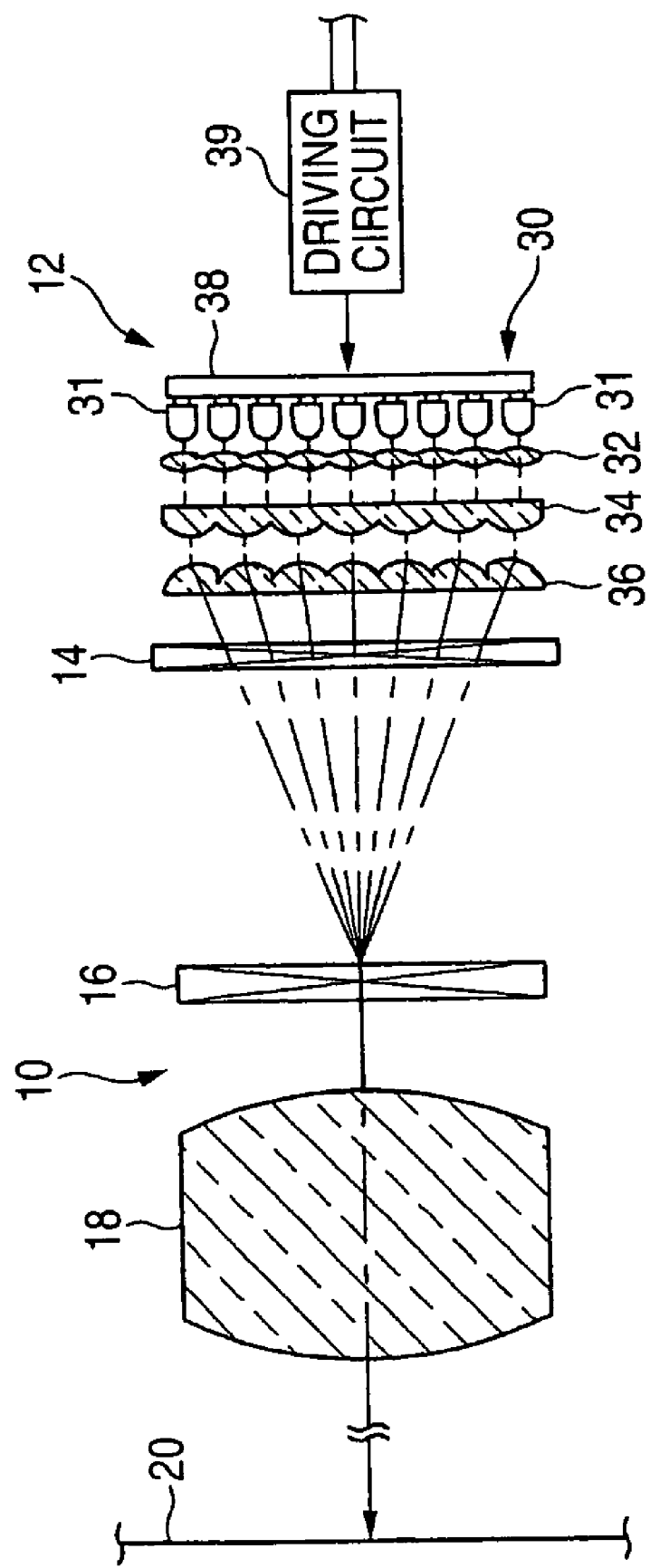
FIG. 1 is an outline constitution view of one embodiment of a projector.

Reference numerals are used to identify various elements in the drawings including the following:
2, 31 LEDs
4, 33, 35, 37 lenses
10 projector
12 illumination apparatus
30 LED array
32 first lens array
34 second lens array
36 third lens array
39 driving circuit

DETAILED DESCRIPTION OF THE INVENTION

FIG. 1 shows an outline constitution view of a liquid crystal projector using an illumination apparatus of the invention. A projector 10 is provided with an illumination apparatus 12, a polarized light converting element 14, a liquid crystal panel 16, and a projection lens 18. The illumination apparatus 12 irradiates illumination light made to be uniform to a total of a rear face of the liquid crystal panel 16 although described later in details. The polarized light converting element 14 is arranged between the illumination apparatus 12 and the liquid crystal panel 16. The polarized light converting element 14 converts illumination light from the illumination apparatus into linearly polarized light.

As is well known, the liquid crystal panel 16 controls an amount of light to be transmitted by controlling a direction of aligning liquid crystals sealed between two sheets of transparent plates. By arranging color filters of R, G, B for respective pixels aligned in a matrix shape, the liquid crystal panel 16 is allocated with any of basic color light. Further, the liquid crystal panel 16 controls light transmittances for respective pixels based on projected image data. By transmitting through the liquid crystal panel 16, illumination light from the illumination apparatus 12 is provided with image information and image light is generated. The image light is projected to a screen 20 by the projection lens 18.

Figure 2:
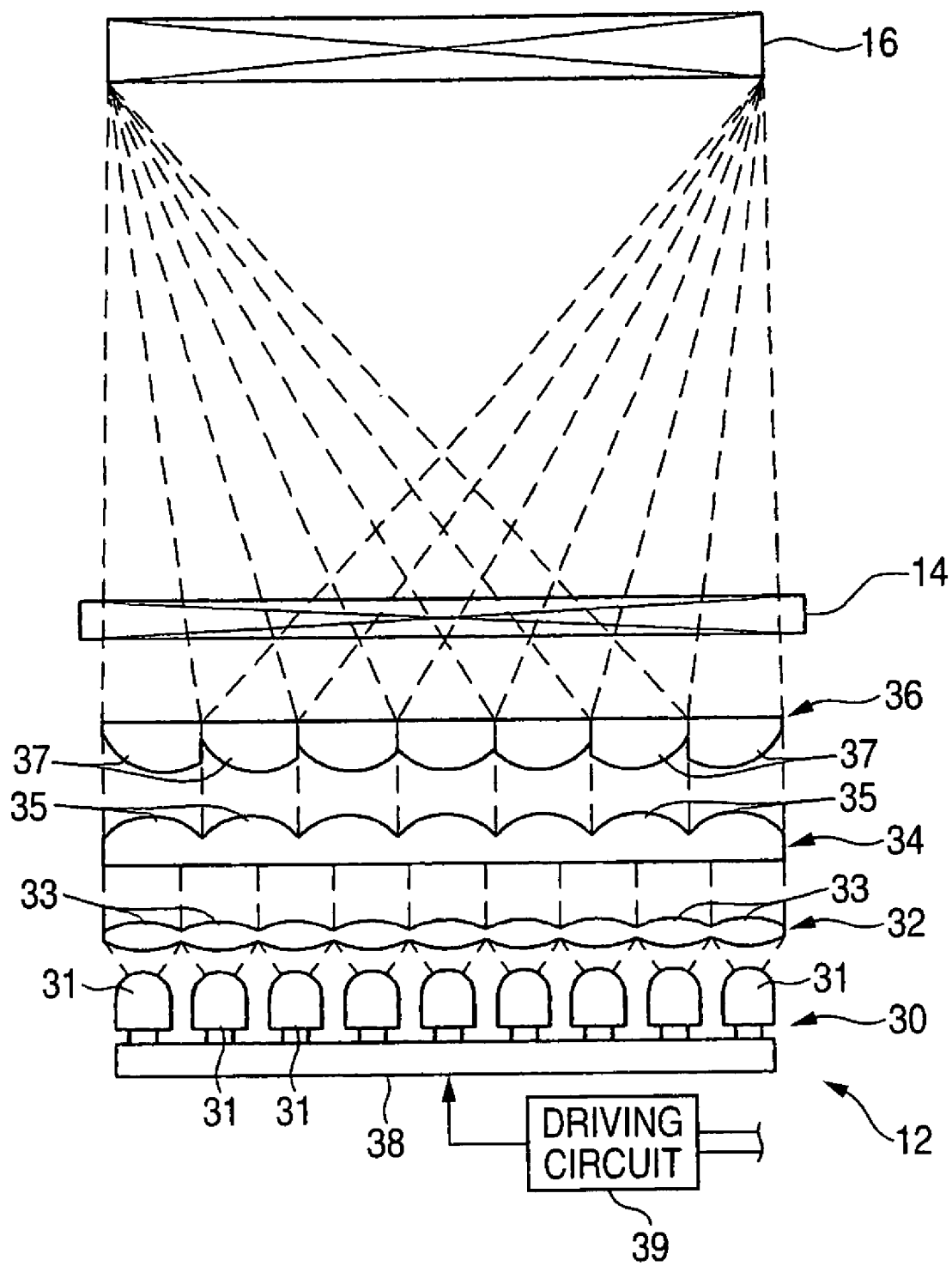
FIG. 2 is an outline constitution view of one embodiment of an illumination apparatus.

As shown in FIG. 2, the illumination apparatus 12 is constituted by an LED array 30 and a first through a third lens arrays 32, 34, 36. The LED array 30 is provided with a plurality of LEDs 31 for emitting white light arranged in a matrix arrangement in a lengthwise direction and a crosswise direction at a base plate 38 (refer to FIG. 3). The LED array 30 is connected to a driving circuit 39 controlled by the projector 10. The respective LEDs 31 irradiate white light to the first lens array 32 by being supplied with a power source from the driving circuit 39. Illumination light from the LED array 30 is constituted by the respective LEDs 31.

The first lens array 32 is provided with lenses 33 arranged to correspond to the respective LEDs 31 of the LED array 30 in 1:1 correspondence. A light flux irradiated from a corresponding one of LED 31 is incident on each lens 33. Further, the lens 33 diffracts an incident light flux to constitute a substantially collimated light flux to be emitted to the second lens array 34. In this way, by providing the first lens array 32, illumination light from the LED array 30 can efficiently be utilized without being diffused.

Illumination light from the LED array 30 constituted to be substantially collimated light by transmitting through the first lens array 32 is irradiated to a rear face side of the second lens array 34. The second lens array 34 is provided with a plurality of lenses 35 arranged in a matrix arrangement in a lengthwise direction and a crosswise direction (refer to FIG. 3). The second lens array 34 splits illumination light from the LED array 30 into a plurality of pieces of secondary illumination light by the respective lenses 35.

The third lens array 36 is provided with a plurality of lenses 37. The lens 37 is provided to correspond to the lens 35 of the second lens array 34 in 1:1 correspondence. Further, the respective lenses 37 are arranged to decenter such that respective axes thereof are directed to a center of the liquid crystal panel 16. Thereby, a plurality of pieces of secondary illumination light split by the lenses 35 of the second lens array 34 are incident on the respective corresponding lenses 37 and thereafter diffracted during a time period of transmitting the lenses 37 and irradiated to overlap each other to a rear face of the liquid crystal panel 16.

In this way, by superposing the secondary illumination light to irradiate, a nonuniformity in a brightness of illumination light effected by differences of brightnesses of the respective LEDs 31 can be prevented. However, as described above, each LED 31 emits light in which the intensity at the center (optical axis) is high and the more disposed on the outer side, the lower the intensity and therefore, when the in-face intensity distribution of the secondary illumination light is patterned as in the examples of FIGS. 6A to 6C, FIGS. 7A to 7C, FIGS. 8A and 8B, and FIG. 9, the nonuniformity in the brightness is brought about in the illumination light.

Figure 3A:
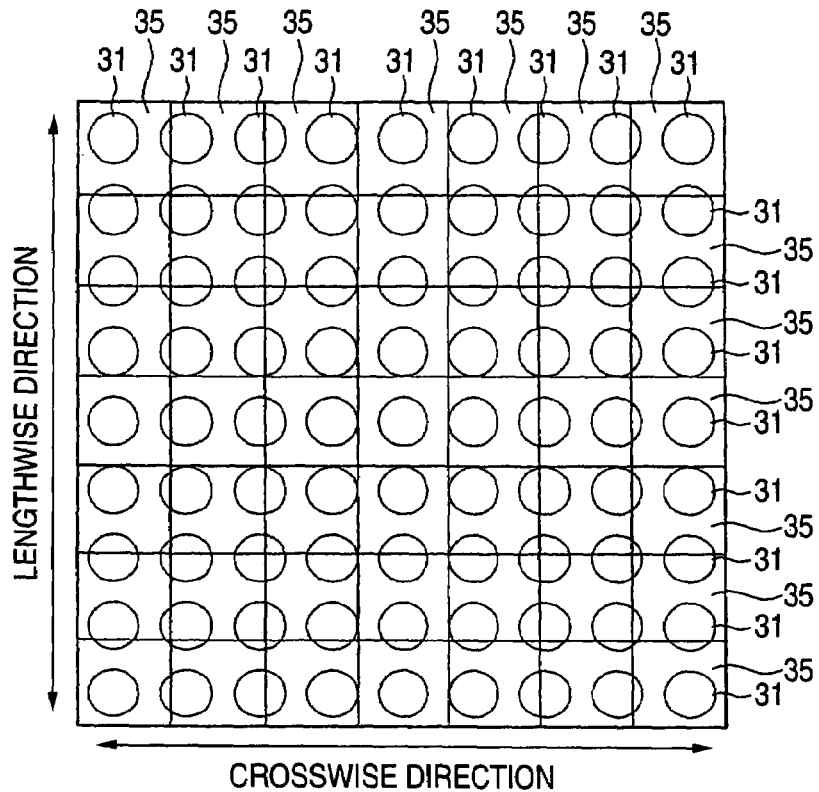
FIGS. 3A and 3B illustrate explanatory views showing an example in which a relationship between a number of LEDs and a number of lenses of a second lens array are mutually prime with each other in both lengthwise and crosswise directions.

Therefore, according to the illumination apparatus 12, as shown in FIG. 3A, in both lengthwise and crosswise directions, the respective LEDs 31 and the respective lenses 45 are aligned such that a relationship of a number of LEDs 31 and a number of the lenses 35 to be aligned are prime with each other (greatest common devisor is 1). The respective LEDs 31 are aligned in a matrix arrangement at inside of a face similar to the rear face of the liquid crystal panel 16 constituting an object of illumination, further, aligned by a constant aligning pitches to be arranged uniformly in the face. Also, the respective lens 35 are aligned in a matrix arrangement at inside of a face similar to the rear face of the liquid crystal panel 16 constituting an object of illumination, further, aligned by a constant aligning pitches to be arranged uniformly in the face. The aligning pitch of LEDs 31 and the aligning pitch of the lenses 35 differ from each other and the respective aligning pitches are determined such that the relationship between the number of LEDs 31 and the number of the lenses 35 to be aligned are prime with each other.

Further, although according to the embodiment, LEDs 31 are aligned to constitute lengthwise 9×crosswise 9 and the lenses 35 are aligned to constitute lengthwise 7×crosswise 7, specific values of the numbers of LEDs 31 and the lenses 35 to be aligned and ratios in the lengthwise and crosswise directions can pertinently be changed in accordance with a size and a ratio in the lengthwise and crosswise directions of the liquid crystal panel. Further, although according to the embodiment, an explanation has been given by taking an example of aligning LEDs 31 such that the aligning pitch in the lengthwise direction and the aligning pitch in the crosswise direction are the same, the aligning pitches in the lengthwise direction and the crosswise direction of LEDs 31 may differ from each other. Similarly, the aligning pitches in the lengthwise direction and the crosswise direction of the lenses 35 may differ from each other.

Figure 3B:
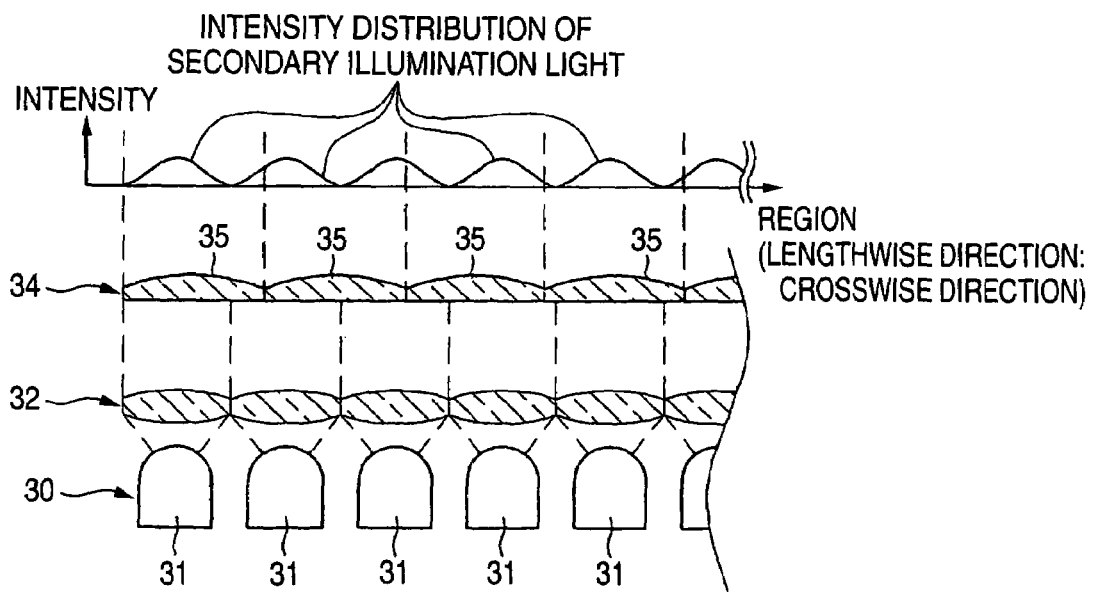

By aligning LEDs 31 and the lenses 35 in this way, as shown in FIG. 3B, intensity distributions of the respective pieces of secondary illumination light split by the respective lenses 35 differ from each other in the lengthwise direction and in the crosswise direction. Thereby, according to all of pieces of secondary illumination light split by the respective lenses 35, in-face intensity distributions differ from each other irregularly. Further, a plurality of pieces of secondary illumination light having the different in-face intensity distributions are superposed by the third lens array 36 and therefore, the liquid crystal panel 16 can be illuminated by a uniform intensity.

As described above, according to the illumination apparatus 12 of the invention, in splitting light from the LED array, the in-face intensity distributions of pieces of secondary illumination light are made to differ from each other irregularly and the pieces of the secondary illumination light are superposed to irradiate to the irradiated region. Therefore, illumination light having a uniform intensity can be irradiated to the irradiated region.

Further, according to the invention, by illuminating the liquid crystal panel by the uniform intensity, the liquid crystal projector capable of projecting an image having a high grade without a nonuniformity in the brightness can be provided. Further, a number of liquid crystal projectors using an ultra high pressure mercury lamp or a metal halide lamp or the like as a light source can be provided with illumination light having a uniform intensity by providing a lens array, dividing the illumination light to a plurality of pieces of secondary illumination light by the lens array and superposing the disintegrated pieces of illumination light to irradiate. Therefore, when the invention is applied in changing light sources of the liquid crystal projectors and using LED arrays, a number of parts can be used and therefore, a large-scaled specification change is not needed to execute and cost can be reduced.

Figure 4:
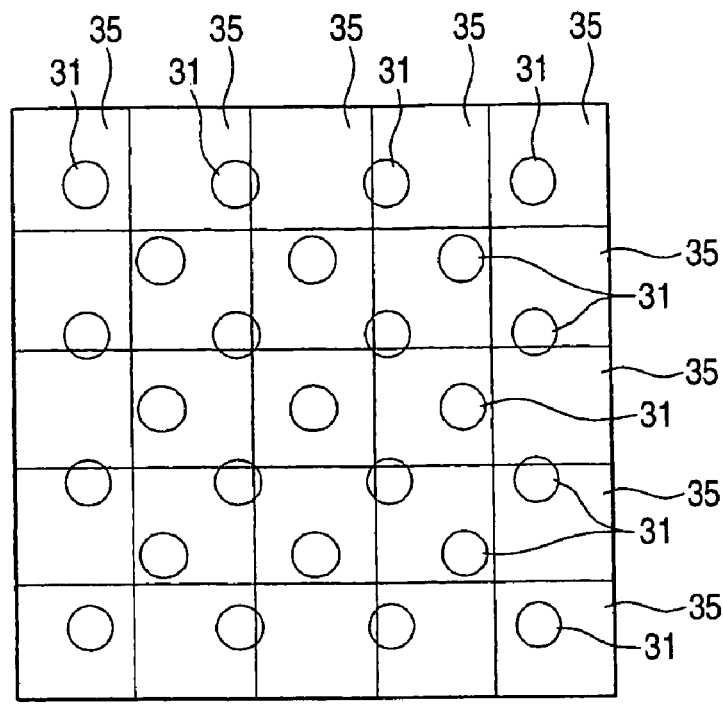
FIG. 4 is an explanatory view showing one embodiment in which LEDs are arranged in a delta arrangement and lenses of a second lens array are arranged in a matrix arrangement.
Figure 5:
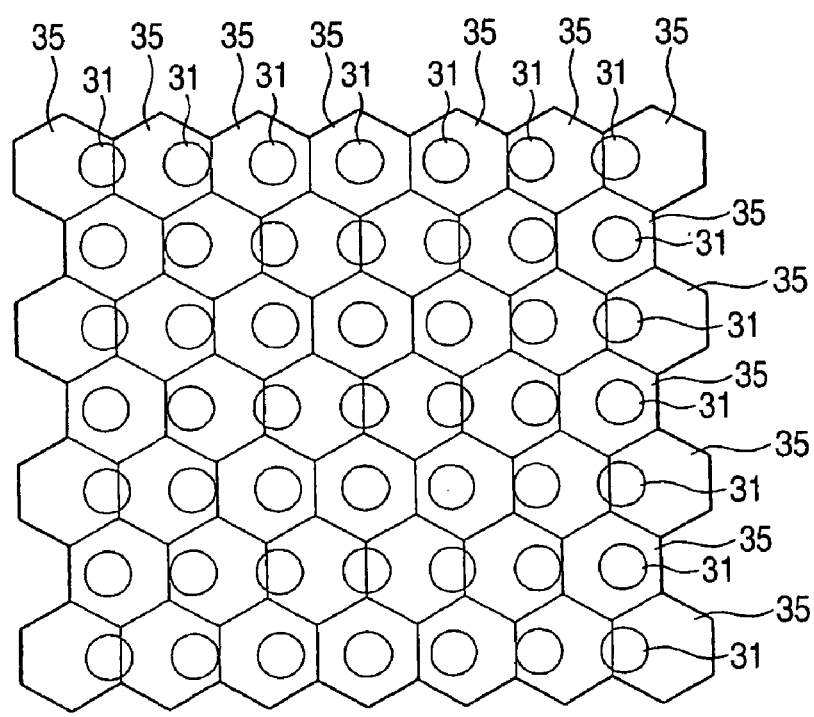
FIG. 5 is an explanatory view showing one embodiment in which lenses of a second lens array are arranged in a delta arrangement and LEDs are arranged in a matrix arrangement.
Figure 6A:
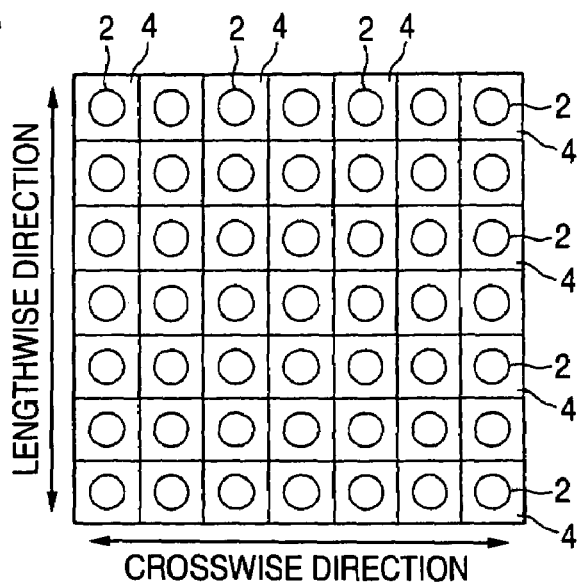
FIGS. 6A to 6C illustrate explanatory views showing an example in which an in-face intensity distribution of illumination light to be superposed is patterned.
Figure 6B:
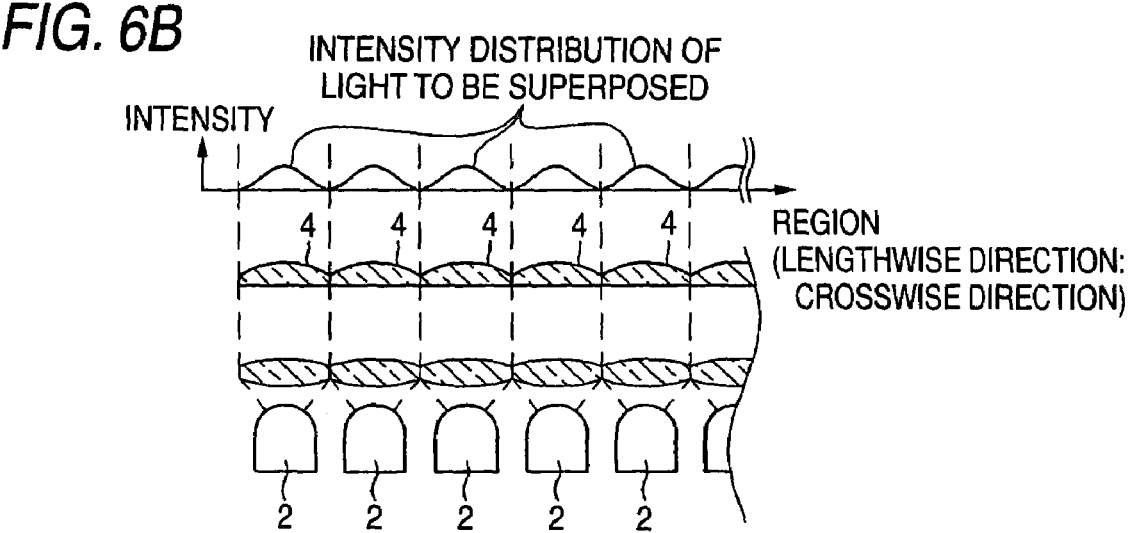
Figure 6C:
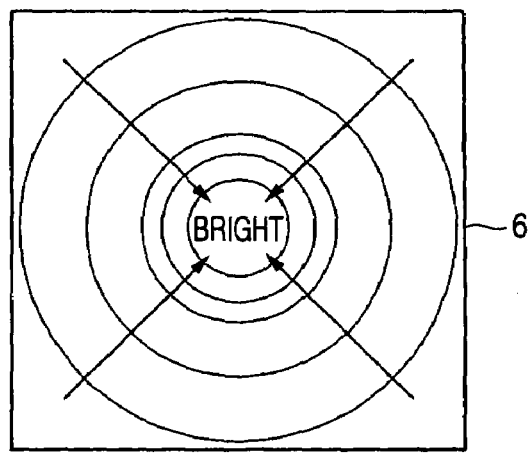
Figure 7A:
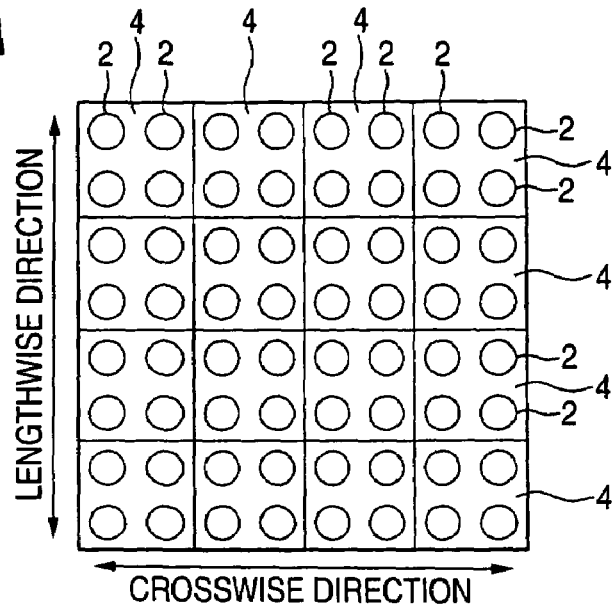
FIGS. 7A to 7C illustrate explanatory views showing an example in which an in-face intensity distribution of illumination light to be superposed is patterned.
Figure 7B:
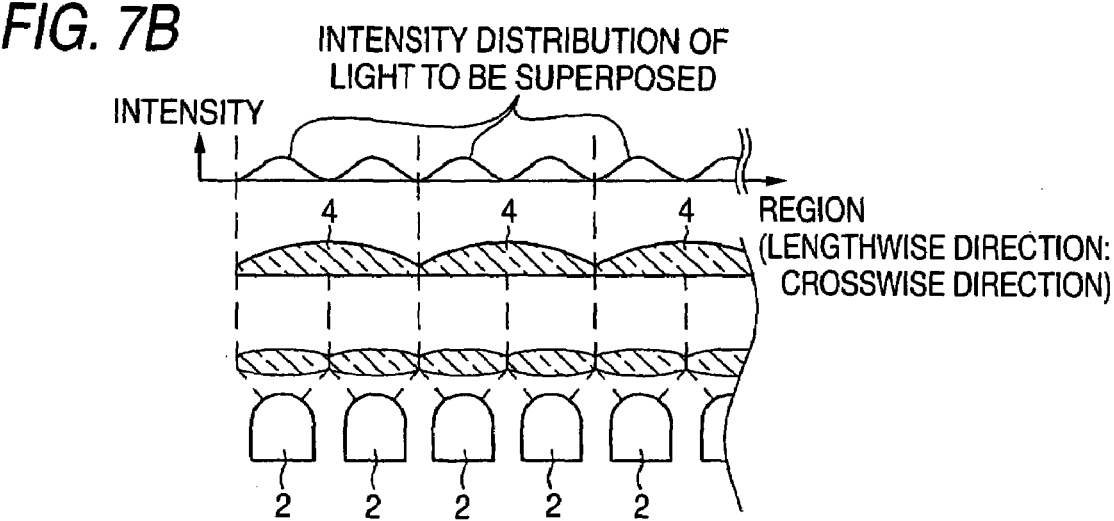
Figure 7C:
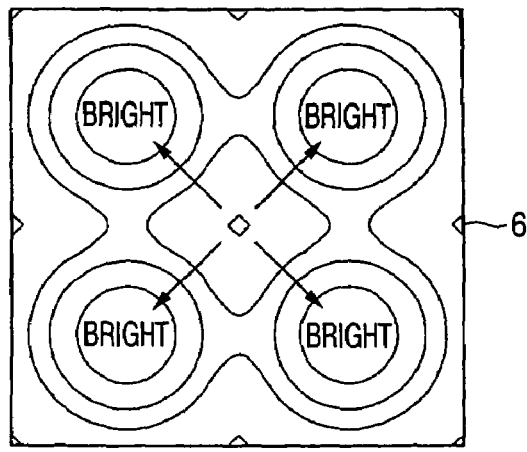
Figure 8A:
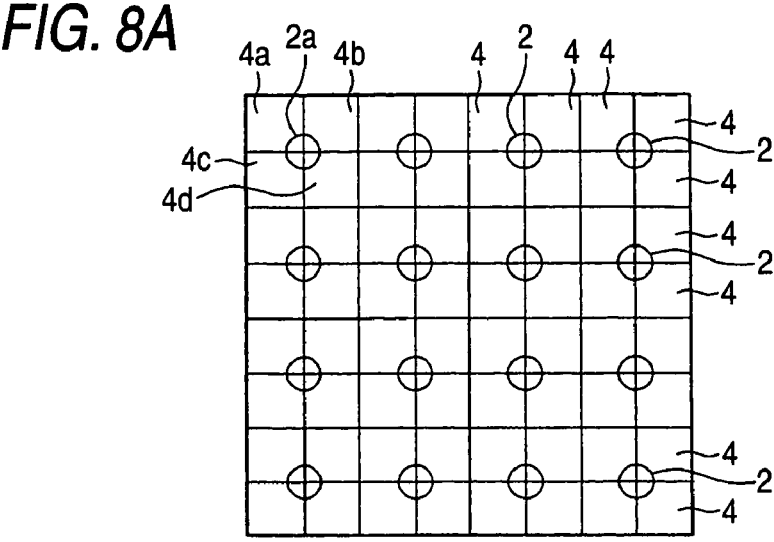
FIGS. 8A and 8B illustrate explanatory views showing an example in which an in-face intensity distribution of illumination light to be superposed is patterned.
Figure 8B:
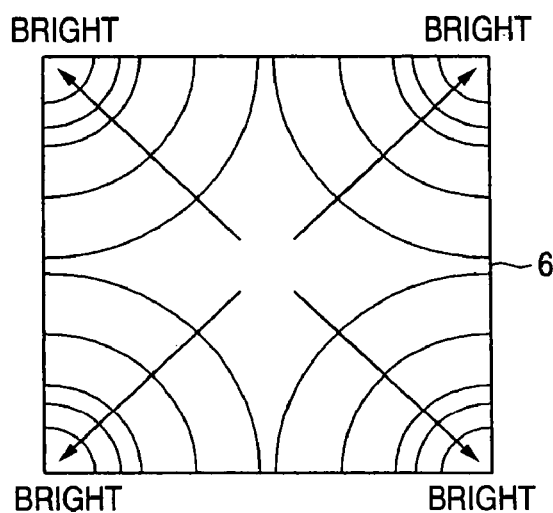
Figure 9:
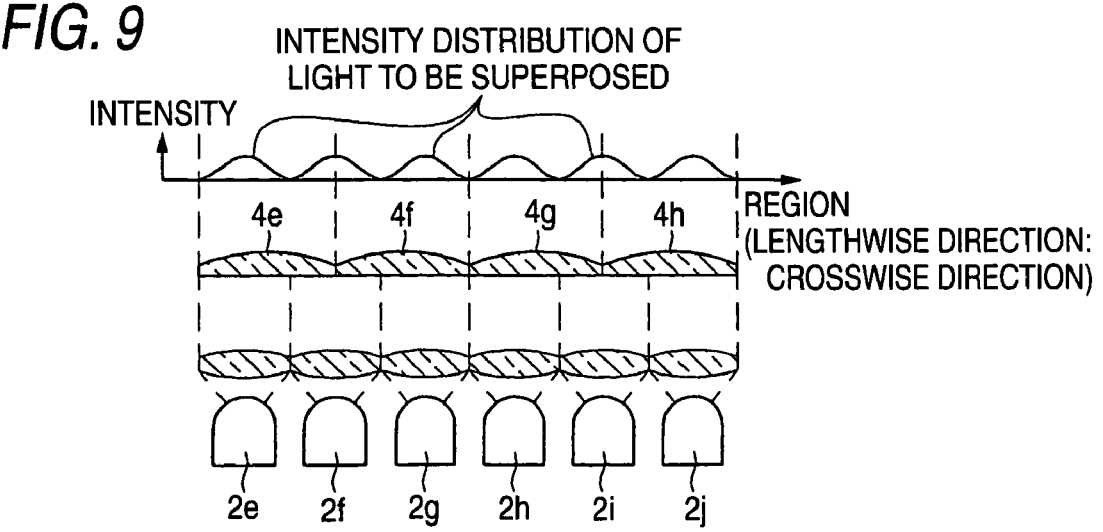
FIG. 9 illustrates an explanatory view showing an example in which an in-face intensity distribution of illumination light to be superposed is patterned.

Further, although according to the above-described embodiment, an explanation has been given by taking an example of aligning LEDs 31 and the lenses 35 of the second lens array both in a matrix arrangement, the invention is not limited thereto. For example, as shown in FIG. 4, by constituting LEDs 31 by a delta arrangement of shifting the aligning pitches between contiguous rows by a half pitch and the lenses 35 may be arranged in a matrix arrangement. Further, as shown by FIG. 5, LEDs 31 may be arranged in a matrix arrangement and the lenses 35 may be constituted by a delta arrangement. In this way, an effect similar to that of the above-described embodiment can be achieved by arranging either one of LEDs and the lenses of the second lens array in a matrix arrangement and the other thereof in the delta arrangement.

Further, although in the above-described embodiment, an explanation has been given by taking the example of splitting the illumination light from the LED array into a plurality of pieces of secondary illumination light by the second lens array and thereafter superposing the respective pieces of secondary illumination light by the third lens array to irradiate to the irradiated region, the illumination light from the LED array may be split to the plurality of pieces of secondary illumination light by a single lens array and the respective pieces of secondary illumination light may be superposed to irradiate to the irradiated region.

Further, although according to the above-described embodiment, an explanation has been given by taking the example of constituting collimated light by illumination light from each LED by the first lens array, the invention is not limited thereto. For example, in place of the first lens array, an LED may include a lens for collimating irradiated light.

Further, although according to the above-described embodiment, an explanation has been given by taking the example of applying the invention to the liquid crystal projector of the single plate type, the invention can also be applied to a liquid crystal projector with three-imager having three sheets of liquid crystal panels in correspondence with R, G, B. In this case, white light from the LED array may be divided into R, G, B components to irradiate to corresponding liquid crystal panels, or three LED arrays respectively emitting light of R, G, B may be provided.

Further, although according to the above-described embodiment, an explanation has been given by taking the example of applying the invention to the liquid crystal projector using a transmitting type liquid crystal panel, the invention may be applied to a liquid crystal projector using a reflection type liquid crystal panel. Further, the invention is not limited to the liquid crystal projector but, for example, the invention may be applied to an image display apparatus of a DMD projector or the like using DMD (digital micromirror device). Further, the invention can also be applied to other than the image display apparatus.

What is claimed is:

1. An illumination apparatus comprising:
   an LED array including a plurality of light emitting diodes disposed in a two dimension;
   a first lens array including a plurality of first lenses in correspondence with the respective light emitting diodes, the first lens array emitting pieces of illumination light irradiated from the respective light emitting diodes to constitute pieces of collimated light in parallel with each other; and
   a superposing optical system comprising a second lens array which is opposed to the first lens array and includes a plurality of second lenses disposed in a two dimension, the superposing optical system splitting emitted light from the first lens array into a plurality of pieces of secondary illumination light by the second lens array and superposing the split respective pieces of secondary illumination light in a common illumination area to irradiate;
   wherein by making aligning patterns or aligning pitches of the first lens and the second lens differ from each other, respective in-face intensity distributions of the pieces of secondary illumination light emitted from the superposing optical system are made to be irregular so that the in-face intensity distributions are averaged in the common illumination area.

2. The illumination apparatus according to claim 1, wherein the respective aligning pitches in two-dimensional directions of the first lens and the respective aligning pitches in two-dimensional directions of the second lens are made to differ from each other and aligning numbers in the two-dimensional directions of the first lens and the second lens are prime to each other.

3. The illumination apparatus according to claim 1, wherein one of aligning patterns of the first lens and the second lens is a matrix arrangement and other thereof is a delta arrangement.

4. The illumination apparatus according to claim 1, wherein the superposing optical system further comprises a third lens array which includes a plurality of third lenses disposed in a two dimension in correspondence with the respective second lenses.

5. An illumination apparatus comprising:
   an LED array including a plurality of light emitting diodes disposed in a two dimension;
   a first lens array including a plurality of first lenses in correspondence with the respective light emitting diodes; and
   a superposing optical system comprising: a second lens array which is opposed to the first lens array and includes a plurality of second lenses disposed in a two dimension; and a third lens array which includes a plurality of third lenses disposed in a two dimension in correspondence with the respective second lenses,
   wherein by making aligning patterns or aligning pitches from first lens and the second lens differ from each other, respective in-face intensity distributions of the pieces of secondary illumination light emitted from the superposing optical system are made to be irregular.

6. The illumination apparatus according to claim 5, wherein the respective aligning pitches in two-dimensional directions of the first lens and the respective aligning pitches in two-dimensional directions of the second lens are made to differ from each other and aligning numbers in the two-dimensional directions of the first lens and the second lens are prime to each other.

7. The illumination apparatus according to claim 5, wherein one of aligning patterns of the first lens and the second lens is a matrix arrangement and other thereof is a delta arrangement.

8. The illumination apparatus according to claim 5, wherein the respective third lenses are arranged to decenter such that respective axes thereof are directed to a center of a liquid crystal panel.

9. A projector comprising:
   a polarized light converting element;
   at least one light valve;
   a projection lens; and
   the illumination apparatus according to claim 1.

* * * * *

UNITED STATES PATENT AND TRADEMARK OFFICE
CERTIFICATE OF CORRECTION

PATENT NO. : 7,278,755 B2 Page 1 of 1
APPLICATION NO. : 11/148197
DATED : October 9, 2007
INVENTOR(S) : Masayuki Inamoto It is certified that error appears in the above-identified patent and that said Letters Patent is hereby corrected as shown below:

On the title page, please amend Item (22) to read as follows:

-- (22) Filed: June 9, 2005 --.

Signed and Sealed this

Eighteenth Day of December, 2007

JON W. DUDAS
*Director of the United States Patent and Trademark Office*